(12) United States Patent
Wildschek et al.

(10) Patent No.: US 8,255,096 B2
(45) Date of Patent: Aug. 28, 2012

(54) MINIMIZING DYNAMIC STRUCTURAL LOADS OF AN AIRCRAFT

(75) Inventors: Andreas Wildschek, Taufkirchen (DE); Rudolf Maier, Miesbuch (DE); Falk Hoffmann, Glonn (DE); Matthieu Jeanneau, Toulouse (FR); Nicky Aversa, Montaigut S/Save (FR)

(73) Assignee: Airbus Operations SAS, Toulouse (FR)

( * ) Notice: Subject to any disclaimer, the term of this patent is extended or adjusted under 35 U.S.C. 154(b) by 868 days.

(21) Appl. No.: 12/161,878

(22) PCT Filed: Jan. 19, 2007

(86) PCT No.: PCT/EP2007/000445
§ 371 (c)(1),
(2), (4) Date: Oct. 7, 2008

(87) PCT Pub. No.: WO2007/085378
PCT Pub. Date: Aug. 2, 2007

(65) Prior Publication Data
US 2009/0084908 A1     Apr. 2, 2009

(30) Foreign Application Priority Data
Jan. 25, 2006 (EP) .................................. 06001510

(51) Int. Cl.
*G01C 23/00*     (2006.01)
(52) U.S. Cl. ................... 701/3; 701/8; 701/14
(58) Field of Classification Search .................. 701/6, 7, 701/14, 3
See application file for complete search history.

(56) References Cited

U.S. PATENT DOCUMENTS

| | | | |
|---|---|---|---|
| 4,796,192 A | 1/1989 | Lewis | |
| 5,515,444 A | 5/1996 | Burdisso et al. | |
| 6,416,017 B1 | 7/2002 | Becker | |
| 2004/0079835 A1 | 4/2004 | Volk | |
| 2007/0171397 A1* | 7/2007 | Halldorsson et al. | 356/28.5 |
| 2008/0203232 A9* | 8/2008 | Enzinger et al. | 244/195 |
| 2009/0294586 A1* | 12/2009 | Brown et al. | 244/118.5 |

FOREIGN PATENT DOCUMENTS

| | | |
|---|---|---|
| DE | 198 41 632 | 3/2000 |
| EP | 1 528 448 | 5/2005 |
| JP | 62-003665 | 1/1987 |
| JP | 62-031600 | 2/1987 |
| JP | 2003-160097 A | 6/2003 |

* cited by examiner

*Primary Examiner* — Hussein A. Elchanti
(74) *Attorney, Agent, or Firm* — Oblon, Spivak, McClelland, Maier & Neustadt, L.L.P.

(57) ABSTRACT

Minimizing dynamic structural loads of an aircraft, introduced by an external excitation, which, includes generating a signal (x) indicative of the external excitation; deriving signals (y) of pre-controlling for actuating control elements of the aircraft from the excitation indicating signal (x) in accordance with a pre-controlling rule, so as to reduce the dynamic structural loads introduced to the aircraft; generating an error signal (e, e*) representing performance of said pre-controlling; optimizing the pre-controlling rule by the error signal (e, e*) and/or the excitation indicating signal (x) so as to minimize the dynamic structural loads.

26 Claims, 5 Drawing Sheets

MINIMIZING DYNAMIC STRUCTURAL LOADS OF AN AIRCRAFT

The invention relates to minimizing dynamic structural loads of an aircraft, introduced by an external excitation to the same.

Dynamic structural loads are introduced to the structure of an aircraft by external excitations, e.g. due to wind, gusts, turbulences or similar influences, and by excitations due to pilot/flight control system demands. As a result of the flexible properties of the aircraft structure, such excitation may result in oscillations or vibrations that may exceed a given magnitude, so that they can be harmful to the aircraft structure, especially of frequencies in the range of natural or characteristic oscillations of the flexible aircraft structure. If it is desired to reduce the mass of the aircraft structure at high aspect ratio of wing and fuselage, it is necessary to take measures against excessive dynamic structural loads.

From the document DE 198 41 632 C2 is known a method for compensating structural oscillations of an aircraft, which are introduced by an external excitation, comprising detecting at least one body rate of the aircraft with a sensor arrangement, providing said at least one body rate to a flight controller, and producing movements of control surfaces of the aircraft to minimize the excited oscillations.

Further it is known from U.S. Pat. No. 5,515,444 an active noise control system for reducing aircraft engine duct noise of a turbofan engine of which a compressor generates a noisy primary sound field. The active noise control system comprises a blade passage sensor mounted within the engine adjacent to the fan for generating a reference acoustic signal, which is correlated with the radiated sound, and a distributed error sensor positioned to be responsive to the primary sound field for generating an error acoustic signal. Acoustic driver means comprised of an array or piezoelectric driven panels are mounted within the fan inlet of the engine for compensating said noisy primary sound field. A controller is responsive to the reference acoustic signal and the error acoustic signal for driving the acoustic driver means to generate a secondary sound field having approximately equal amplitude but opposite phase as said primary sound field to thereby effectively reduce the engine noise.

The object of the present invention is to provide for effective minimizing dynamic structural loads of an aircraft.

The object is achieved by a method of minimizing dynamic structural loads of an aircraft introduced by an external excitation according to claim 1. Further, the object is achieved by an apparatus for minimizing dynamic structural loads of an aircraft structure introduced by an external excitation according to claim 15.

Additional features of the invention are included in the respective dependent claims.

The invention provides for a method of minimizing dynamic structural loads of an aircraft, introduced by an external excitation to the aircraft, comprising generating a signal indicative of the external excitation; deriving signals of pre-controlling for actuating control elements of the aircraft from said excitation indicating signal in accordance with a pre-controlling rule, so as to reduce the dynamic structural loads introduced to the aircraft; generating an error signal representing performance of said pre-controlling; optimizing the pre-controlling rule by said error signal and/or said excitation indicating signal so as to minimize the dynamic structural loads.

The generating said signal representing performance of said pre-controlling as an error signal may be indicative of structural loads of the aircraft structure.

Generating said excitation indicating signal may include detecting signals indicating one or more of intensity and direction of turbulence, wind and gusts, angle of attack, angle of yaw, and Euler-angles. Information of pilot/FCS demand may be added to excitation indicating signal in order to minimize pilot-induced loads/vibrations.

Generating said error signal may include detecting signals indicating one or more of accelerations, stresses or strains at given locations of the aircraft structure.

The generating of said error signal may include subtracting contributions of pilot or flight controller commands to control surfaces of the aircraft, which are included in the structural loads. Said subtracting the influence of pilot or flight controller commands may be carried out on the basis of a rigid body model of the aircraft.

Said excitation indicating signal may be generated from a flexible body model of the aircraft, or an observer/Kalman filter.

Said optimizing the pre-controlling rule may include frequency separation for subtracting the influence of pilot or flight controller commands. Optimizing the pre-controlling rule may include an iterative algorithm.

Said actuating of control elements so as to minimize dynamic structural loads may include actuating one or more of elevator, rudder, aileron or other control surfaces of the aircraft. Said actuating of control elements so as to minimize dynamic structural loads may include actuating one or more of electromechanical, electromagnetic, hydraulic, pneumatic or piezoelectric actuators to introduce load damping forces directly into the aircraft structure.

Optimizing said pre-controlling rule may include generating a transfer function or any other mathematical model, of the aircraft.

Said generating of the transfer function may be carried out by an online-system-identification comprising filtering band-limited random noise or chirp signal or any other identification signal by a number of n adaptive filters, wherein n corresponds to the number of the aircraft transfer functions to be identified, and subtracting the filtering response in vector form from the error signal. System identification may include estimating the primary control path. (For structural vibration/load reduction of an aircraft the secondary control path can be easily estimated from the primary control path and the primary control path is easier to identify than the secondary path.)

Further the present invention is providing for an apparatus for minimizing dynamic structural loads of an aircraft structure introduced by an external excitation to the aircraft, comprising an excitation signal generating arrangement for generating a signal indicative of an external excitation of the aircraft structure; a regulating circuit for deriving pre-controlling signals from said excitation indicating signal in accordance with a pre-controlling rule, for actuating control elements of the aircraft so as to reduce the dynamic structural loads introduced to the aircraft; an error signal generating arrangement for generating a signal representing performance of said pre-controlling as an error signal; an optimizing circuit for optimizing the pre-controlling rule by said error signal and/or excitation indicating signal so as to minimize the dynamic structural loads.

Said error signal generating arrangement may be provided for generating said signal representing performance of said pre-controlling as an error signal to be indicative of structural loads of the aircraft structure.

Said excitation signal generating arrangement may include sensor means for detecting signals indicating one or more of intensity and direction of turbulence, wind and gusts, angle of attack, angle of yaw, and Euler-angles.

Said error signal generating arrangement may be provided for detecting signals indicating one or more of accelerations, stresses or strains at given locations of the aircraft structure. Further, the error signal generating arrangement may be provided for subtracting contributions of pilot or flight controller commands to control surfaces of the aircraft, which are included in the structural loads.

Said error signal generating arrangement may also be provided for subtracting the influence of pilot or flight controller commands on the basis of a rigid body model of the aircraft.

Said excitation signal generating arrangement may be provided for generating the excitation indicating signal from a flexible body model of the aircraft, or observer/Kalman filter.

Said optimizing circuit may include a frequency separator for optimizing the pre-controlling rule by frequency separation in order to be able to cancel out frequency ranges, where controller shall not have any influence. Said optimizing circuit may be provided for optimizing the pre-controlling rule by an iterative algorithm.

Control elements, which are actuated so as to minimize dynamic structural loads may include one or more of elevator, rudder, aileron or other control surfaces of the aircraft. Further, the control elements, which are actuated so as to minimize dynamic structural loads, may include one or more electromechanical, electromagnetic, hydraulic, pneumatic or piezoelectric actuators for introducing load damping forces directly into the aircraft structure.

Said optimizing circuit may be provided for generating a transfer function of the aircraft for optimizing said pre-controlling rule. The optimizing circuit may also be provided for generating the transfer function by an online-system-identification which comprises filtering band-limited random noise or a chirp signal by a number of n adaptive filters, wherein n corresponds to the number of the aircraft transfer functions to be identified, and for subtracting the filtering response in vector form from the error signal.

In the following are disclosed embodiments of the present invention with reference to the drawings, in which.

Figure 1:
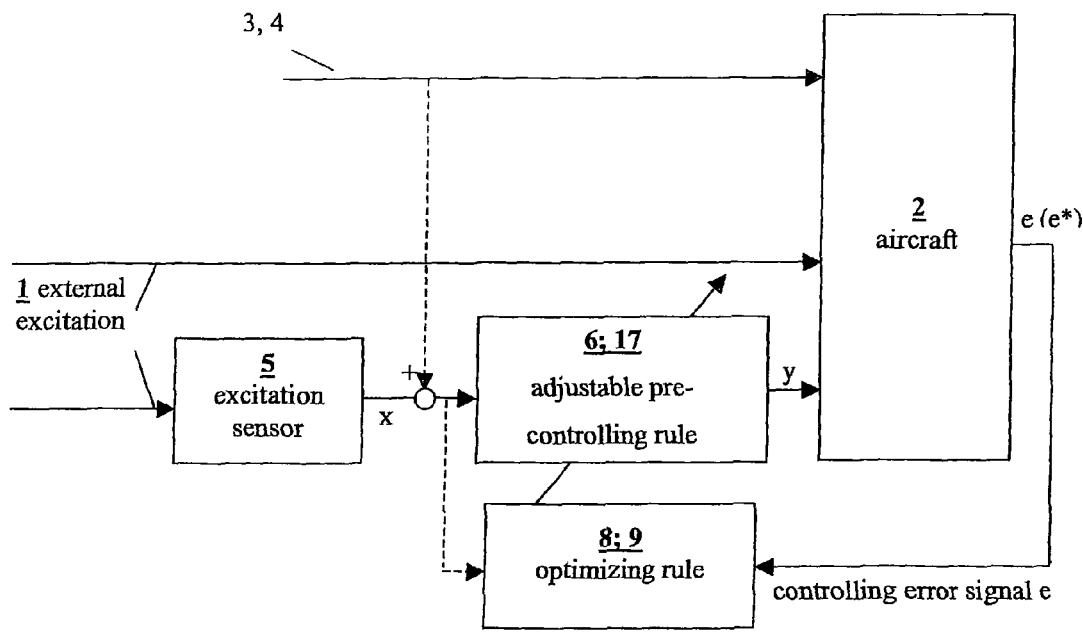
FIG. 1 is a block diagram for disclosing method and apparatus of minimizing dynamic structural loads introduced by an external or pilot/FCS excitation to an aircraft, in accordance with one embodiment of the invention.

FIG. 1 shows one principle embodiment of minimizing dynamic structural loads of an aircraft 2, which are introduced by an external excitation 1. The external excitation 1 may e.g. be wind, gusts or turbulences. The excitation 1 causes dynamic structural loads in the structure of the aircraft 2, especially by natural or characteristic oscillations within the structure due to flexible body properties of the same. In FIG. 1, the excitation 1 is introduced to the aircraft 2, which is regarded as a flexible body.

The excitation 1 is detected by an excitation or reference sensor 5, which is generating a signal x indicative of the external excitation 1, the reference sensor 5 being in this case one or more sensors or a sensor arrangement. The signal x indicative of the external excitation 1 is input to an adaptive pre-control circuitry 6, 17 for deriving control signals y for actuating control elements of the aircraft 2 in accordance with a pre-controlling rule, which is implemented in said adaptive pre-control circuitry 16, 17. The control signals y for actuating control elements reduce the dynamic structural loads, which are introduced to the aircraft 2 by the external excitation 1. The control signals y are output to the aircraft 2 so as to actuate the control elements, which are provided in the same.

In the aircraft 2 is generated a signal indicative of structural loads which are introduced to the same by said external excitation 1, which signal is used as an error signal e, e* and which is describing control performance of the pre-controlling rule of circuitry 6, 17. The error signal e, e* is input to a circuitry 8, 9 for optimizing the pre-controlling rule by said error signal e, e*, so as to minimize the dynamic structural loads, i.e. to reduce the amplitude of the oscillations within the structure of the aircraft 2. The optimization in circuitry 8, 9 is performed in a way that a minimization of the oscillations and of the dynamic structural loads is adapted to actual load and flight conditions of the aircraft 2. If the optimizing rule is not iterative, the signal x is also used for optimizing the adjustable pre-controlling rule of circuitry 6, 17.

The reference sensor 5 may comprise a number of sensors, which detect intensity and direction of wind, turbulence and gusts, angle of attack, angle of yaw, etc., e.g. as Euler-angles. The error signal e, e* which is detected by error sensors in the aircraft 2, may include accelerations at different given locations of the aircraft structure, as well as stresses or strains at given locations at the aircraft structure, for example. The control elements of the aircraft 2, which are actuated in order to minimize the dynamic structural loads, may include elevator, rudder, aileron or other control surfaces, and they may include electromechanical, electromagnetic, hydraulic, pneumatic or piezoelectric actuators for directly introducing load damping forces into the aircraft structure.

Further, as a specific option, also pilot or flight control system commands 3, 4, which may also induce unwanted structural loads and vibrations in the aircraft 2, are added to the excitation indication signal x. Thus, also structural loads and vibrations of the aircraft due to pilot or flight system commands are minimized.

The optimization of the pre-controlling rule may be carried out in accordance with an appropriate method, i.e. methods of least mean square root errors or recursive methods of least mean square root errors (LMS, RLS) or methods of minimizing quadratic cost function.

Figure 2:
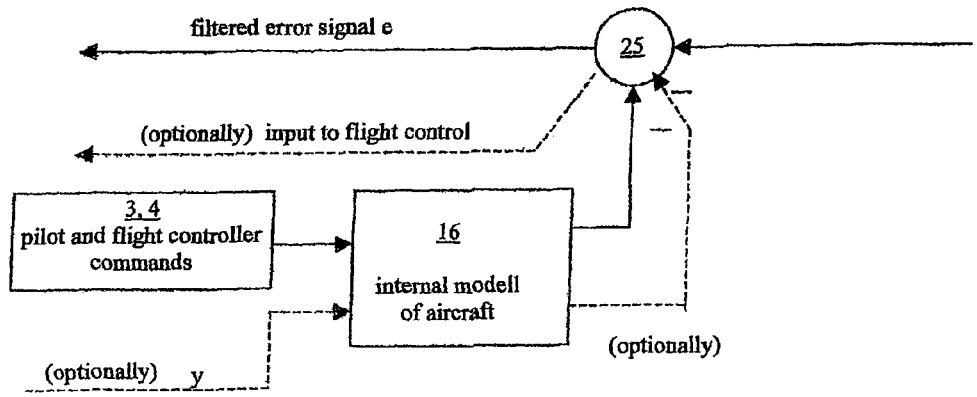
FIG. 2 is a block diagram for describing the generation of an error signal, which is used in the present invention.

FIG. 2 shows the generation of a filtered error signal e. There an internal model 16 of the aircraft 2 is provided for subtracting contributions of pilot or flight controller commands 3, 4, which are output to the control surfaces of the aircraft and causing structural loads by the corresponding flight maneuver. However, these commands shall not result in an activity of the pre-controlling circuitry 6, 17. That means that, of course, pilot or flight controller commands will generally not be compensated by the pre-controlling circuitry 6, 17, but pilot-induced vibrations will be compensated. For this purpose internal model 16 is a rigid body model.

The signals output from the internal aircraft model 16 are combined in a combining circuit 25 with the original error signal e* to generate the filtered error signal e which is output to optimizing circuitry 8, 9. Alternatively the control commands y for the control surfaces of the aircraft can be input to the internal model 16, and the signal x indicative of the external excitation can be taken from the combining circuit 25.

If it is intended to use the internal model 16 of the aircraft 2 only for subtracting the influence of pilot or flight controller commands from the original error signal e*, the internal model 16 can be a rigid body model. However, if the internal model 16 is intended to generate the external excitation indicating signal x, it has to be a complete flexible body model of the aircraft 2. The internal model may also be used to subtract parasitic feedback from the excitation indicating signal.

Figure 3:
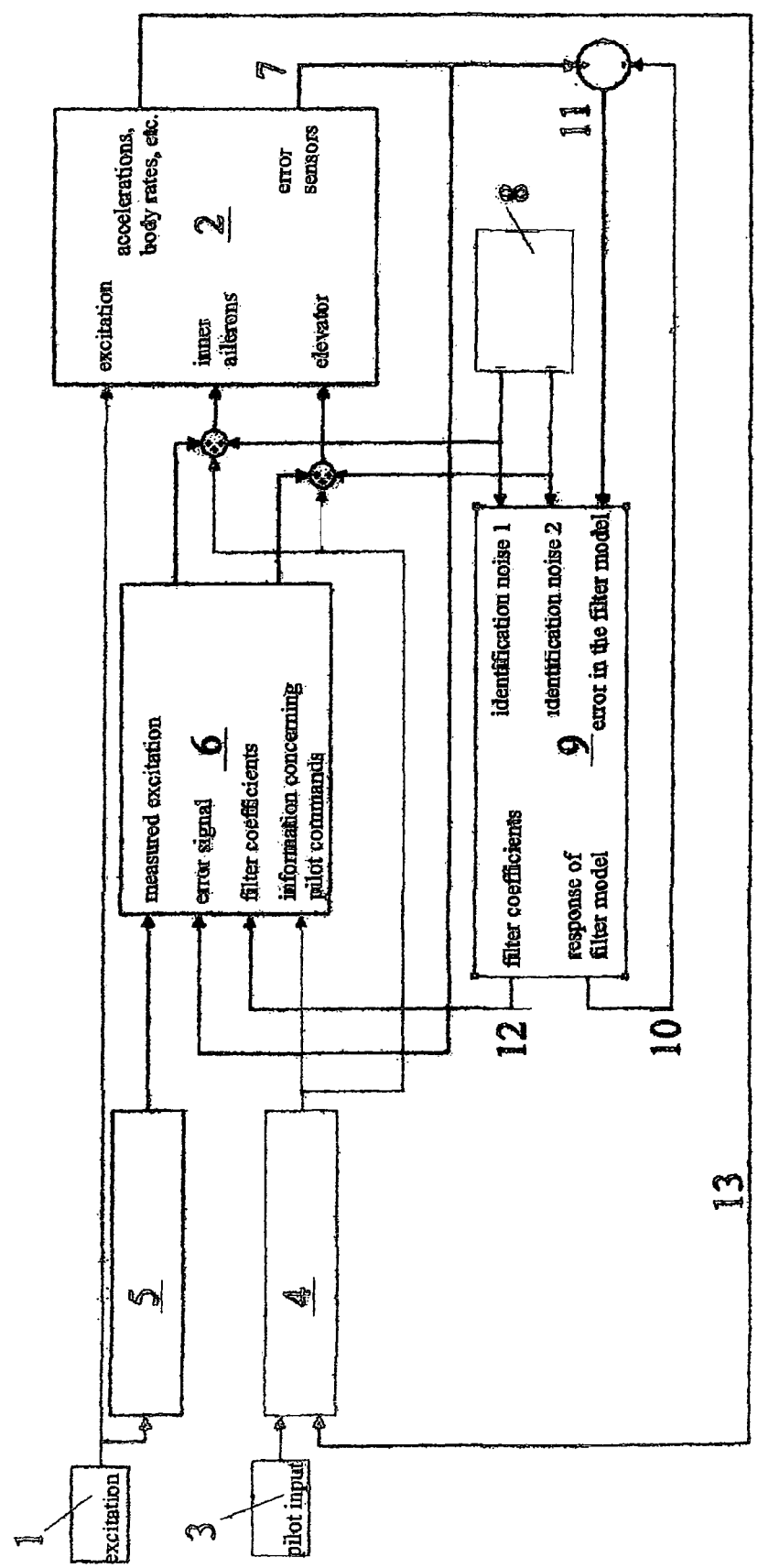
FIG. 3 is a schematic block diagram for describing a further embodiment of method and apparatus of minimizing dynamic structural loads of an aircraft, introduced by an external excitation, in accordance with the present invention.

FIG. 3 shows in a schematic block diagram one embodiment of an apparatus for minimizing dynamic structural loads of an aircraft. The external excitation 1 which may be wind, gusts or turbulences, is introduced to the structure of the aircraft 2. The excitation 1 causes vibrations and oscillations, especially natural or characteristic oscillations within the aircraft structure. The aircraft 2 is controlled by pilot command 3 and by flight controller 4. The wind excitation 1 is detected by reference sensor 5. This can be a laser-optical sensor or other wind sensors (e.g. α-sensor, β-sensor).

This excitation or reference signal, which includes in general a three-dimensional information of velocity and direction of wind, is forwarded to pre-controlling circuitry 6 for actuating the control elements of the aircraft 2 so as to reduce and minimize the structural oscillations and the structural loads of the aircraft 2. The control elements can be, as already described above, elevator, rudder, aileron or other, aerodynamically effective control surfaces, and/or they can be mechanical control elements so as to minimize the structural loads directly, electromechanical, electromagnetic, hydraulic, pneumatic or piezoelectric actuators to introduce load damping forces directly into the aircraft structure.

For adapting and optimizing, said pre-controlling circuitry 6 has input one or more error signals generated by error sensors 7, which error signals are detected in the aircraft 2 and which are to be minimized, and further information concerning transfer functions of the aircraft 2, which is provided by an online-system-identification 9, and information concerning pilot and flight controller commands, which shall not be compensated by the structural load minimizing system.

The online-system-identification 9 is connected to a random noise generator 8, which is generating a band-limited random noise for each actuator. None of the random noise signals must be correlated with the excitation signal or reference signal. The transfer functions for different actuators should not be measured at the same time to provide for a good signal-to-noise ratio. The noise signals are forwarded to the actuators or control elements for minimizing the structural loads and to the system-identification 9. In the system-identification 9, the identification noise signals pass through n adaptive filters (e.g. FIR, IIR, Neuronal Networks, etc.), wherein n is the number of the aircraft transfer functions to be identified.

The entity of those adaptive filters is providing a filter model of the aircraft 2. The responses 10 of this filter model to the identification noise signals are subtracted in vector form by subtraction means 11 from the error signals generated by error sensors 7 of the aircraft 2. Those parts of the error signals, which correlate with the identification noise signals, are the responses of the aircraft 2 to the identification noise signals. The result of this vector subtraction represents the error between aircraft transfer functions and filter model.

Filter coefficients 12 are frequency field transformed and forwarded to the adaptive pre-controlling circuitry 6. The adaptation of the filter model coefficients 12 can be done by a LMS- or RLS-algorithm or by another algorithm. This makes use of the identification noise signals generated by generator 8 to be sure that in the system identification 9 only those parts in the signals output from the error sensors 7 are considered, which are correlating with the identification noise signals. Accelerations, body rates, etc. of the aircraft 2 are also input to the flight controller 4.

Figure 4:
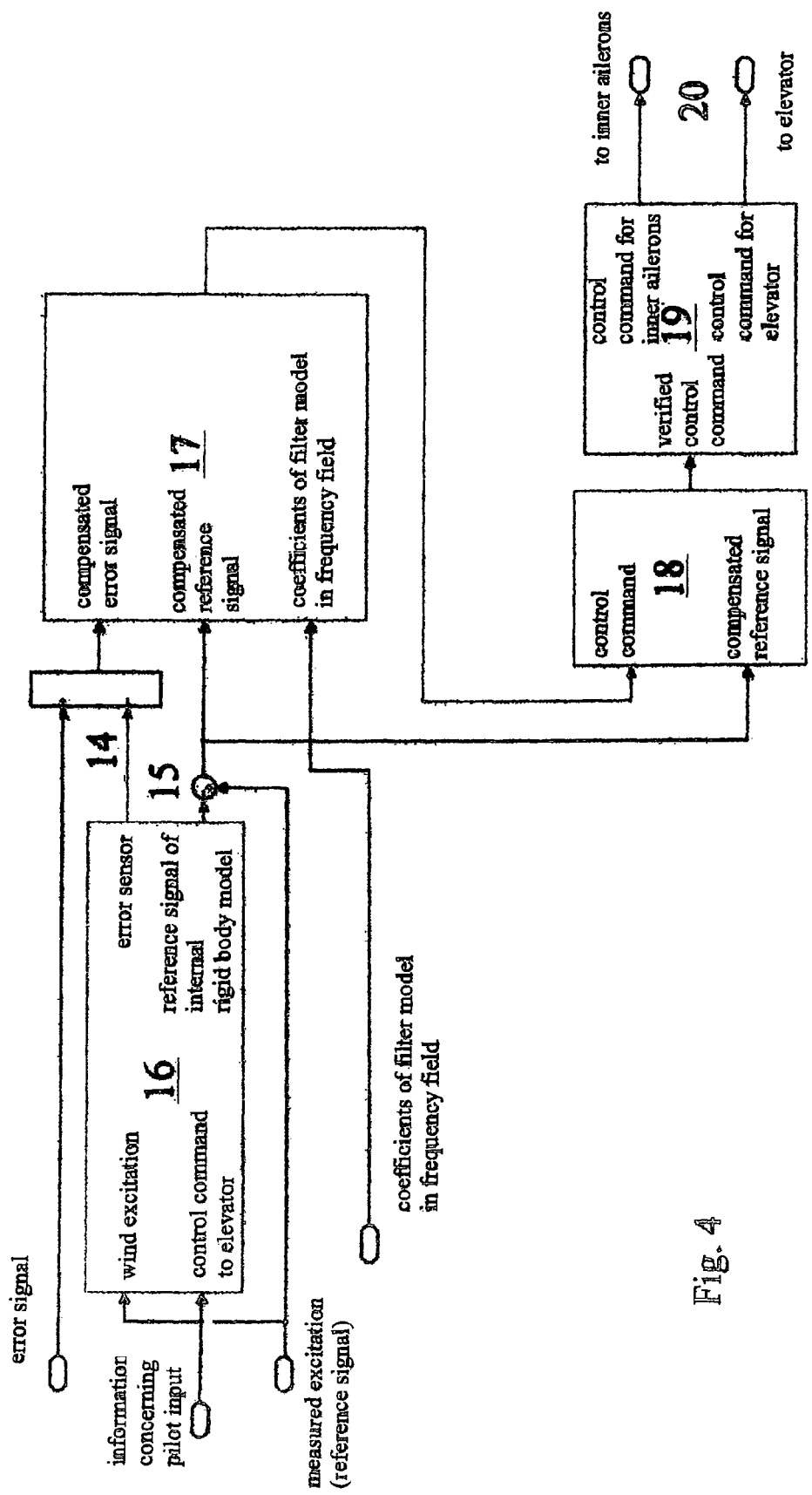
FIG. 4 is a schematic block diagram of an adaptive pre-regulation or pre-controlling circuit used in one embodiment of the present invention.

One embodiment of an adaptive pre-controlling circuitry 6 is shown in FIG. 4. Both, the error signals of the aircraft 2 generated by error sensors 7, and the reference signals of the reference sensor 5 (FIG. 3) include in general information caused by pilot and flight controller commands. To avoid a not intended minimizing or compensating of pilot and flight controller commands by the dynamic structural load minimizing system, contributions of pilot and flight controller commands are subtracted from the reference and error signals by combining circuits 14 and 15, respectively. The contributions or the influence of pilot and flight controller commands 3, 4 to the signals of reference sensors 5 and error sensors 7 is computed by means of internal rigid body model 16 of the aircraft 2. This internal model 16 includes only the flight-mechanical properties of the rigid body aircraft and is usually well known when designing the aircraft.

The compensated error and reference signals are input to the adaptive pre-controlling circuitry 17 together with the frequency field coefficients of the filter model. The output of the pre-controlling circuitry 17, usually in vector form, is passed to a plausibility check unit 18 and input to a circuitry 19 for optimal distribution of control commands to the different actuators 20 in order to minimize structural loads/vibrations.

Figure 5A:
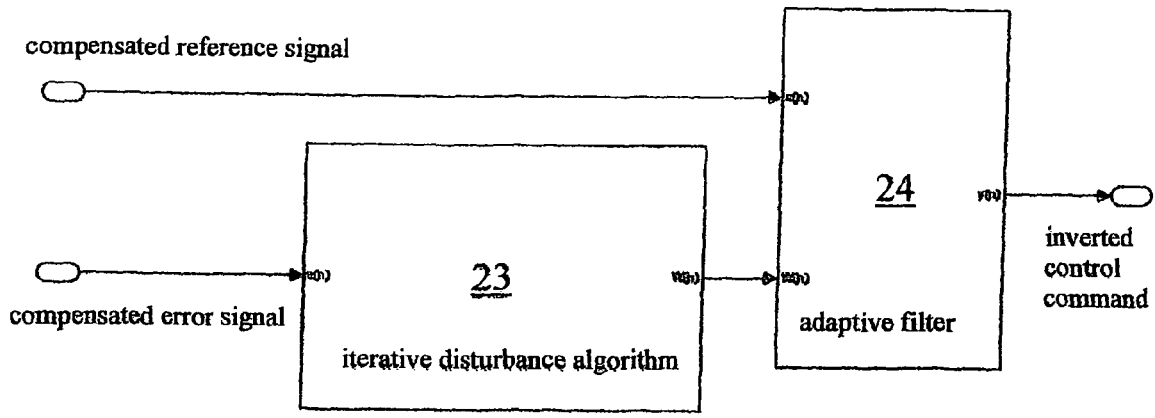
FIG. 5 is another schematic block diagram for describing an adaptive pre-controlling.

One embodiment of an adaptive pre-controlling is given in FIG. 5a. Adaptation of an adaptive filter 24 can be done by means of an iterative disturbance algorithm 23, which is varying filter coefficients by $\Delta w$ and checking whether the error signal will be smaller or bigger. If the error signal is smaller, the filter coefficient will be varied once more by $\Delta w$, else by $-\Delta w$, and so on. For such an iterative algorithm no information concerning the transfer functions of the aircraft is necessary, and no online-system-identification.

Figure 5B:
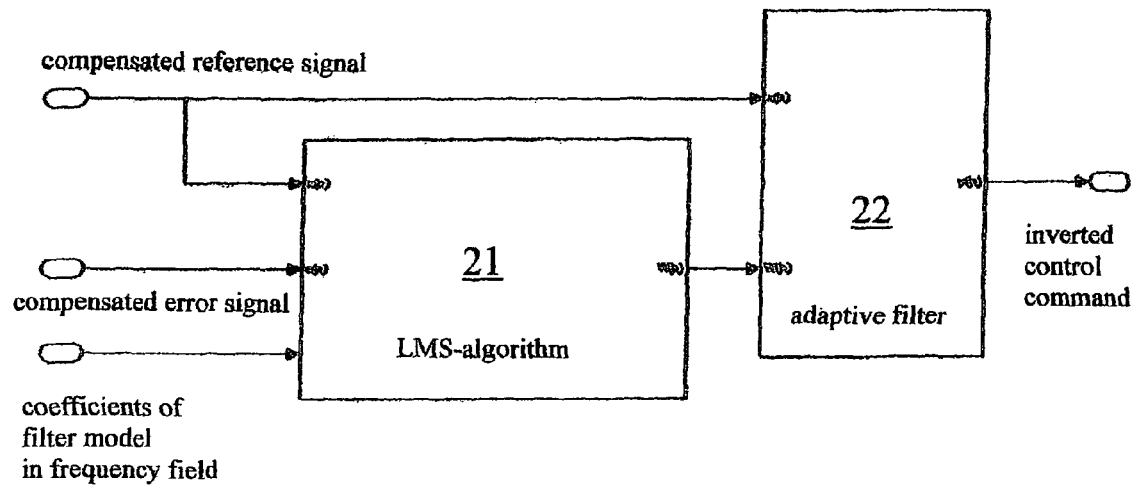

Another embodiment of an adaptive pre-controlling is given in FIG. 5b. A compensated reference signal which includes information concerning the external excitation is input to n adaptive filters 22, wherein n is the number of the structural load damping actuators times the number of the error sensors. The adaptive filters output control commands to plausibility check unit 18 and to circuitry 19 for optimal distribution of the control commands to the actuators 20 or control elements for minimizing the structural loads. The adaptation of the filter coefficient can be done i.e. by a filtered-X-LMS-algorithm 21, which is state of the art. The filtered-X-operation can be carried out with the coefficients of the filter model of the online-system-identification in the frequency field.

Figure 6:
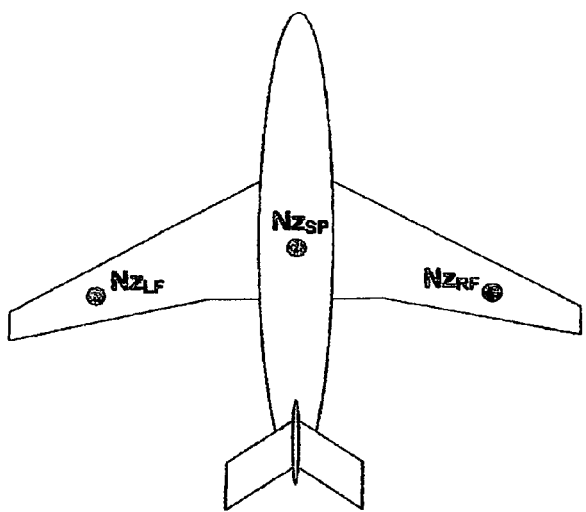
FIG. 6 is a schematic view of an aircraft, showing a sensor arrangement which can be used in accordance with one embodiment of the present invention for minimizing dynamic structural loads of an aircraft.

FIG. 6 shows an embodiment of a filter arrangement of three sensors for detecting accelerations in Z-direction (accelerations perpendicular to the wing surface of the aircraft). The acceleration sensors $Nz_{LF}$ and $Nz_{RF}$ are at the wing tips, and $Nz_{sp}$ is for measuring the Z-acceleration of the center of mass of the aircraft. However, it is also possible to provide acceleration sensors at the front and/or rear part of the fuselage to measure the acceleration in y- and z-directions for damping vertical and horizontal accelerations of the fuselage.

Figure 7:
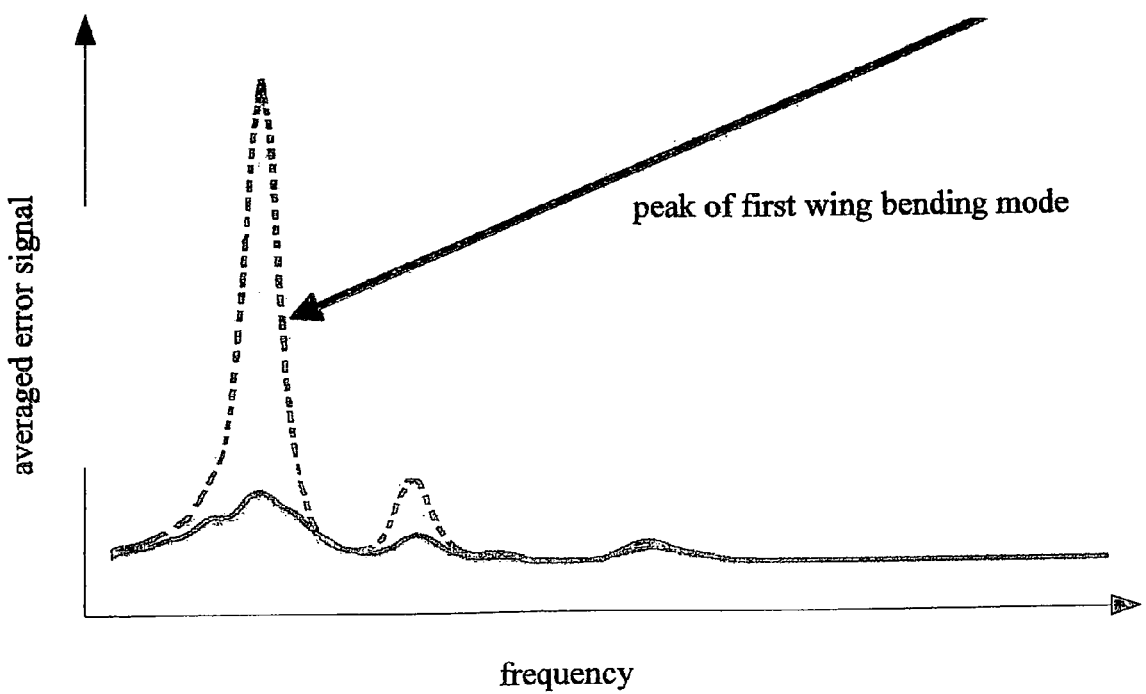
FIG. 7 is a diagram, which shows magnitude of an averaged error signal, which is indicative of structural loads introduced by an external excitation to an aircraft, versus frequency.

An example of minimizing the structural loads introduced to an aircraft by an external excitation by wind is shown in FIG. 7, wherein an averaged error signal is shown as a function of frequency. The dotted line shows the error signal without structural load minimizing, whereas the solid line shows the same with minimizing the structural loads. The maximum peak shows the first vertical bending vibration of the wing, i.e. natural or characteristic oscillation caused by the flexible properties of the same. It can be seen that the bending vibration and, therefore, the structural loads, are significantly reduced.

LIST OF REFERENCE SIGNS 1 excitation
2 aircraft
3 pilot command
4 flight controller commands
5 reference sensor
6 adaptive pre-controlling circuitry
7 error sensor
8 band-limited random noise or chirp generator
9 system identification
10 response of filter model
11 subtraction means
12 filter coefficients
14 combining circuit
15 combining circuit
16 internal aircraft model
17 adaptive pre-control
18 plausibility check unit
19 control surface driver circuit
20 actuators (control surfaces)
21 LMS-algorithm
22 adaptive filter
23 iterative disturbance algorithm
24 adaptive filter
25 combining circuit
x excitation indication signal
y control signal
e* error signal
e filtered error signal

The invention claimed is:

1. A method of minimizing dynamic structural loads of an aircraft, introduced by an external excitation to the aircraft, comprising:
    generating a signal (x) indicative of the external excitation by a first sensor located in the aircraft, the first sensor measuring the external excitation;
    deriving signals (y) of pre-controlling for actuating control elements of the aircraft from said excitation indicating signal (x) in accordance with an adjustable pre-controlling rule, so as to reduce the dynamic structural loads introduced to the aircraft;
    generating an error signal (e, e*) by a second sensor located in the aircraft, said error signal (e, e*) indicative of structural loads of the aircraft structure and representing performance of said pre-controlling; and
    optimizing said adjustable pre-controlling rule by said error signal (e, e*) and/or by the excitation indicating signal (x) so as to minimize said error signal (e, e*) and thereby the dynamic structural loads.

2. The method according to claim 1, wherein generating said excitation indicating signal (x) includes detecting signals indicating one or more of intensity and direction of turbulences, wind and gusts, angle of attack, angle of yaw.

3. The method according to claim 1, wherein information about a pilot or flight control system command is added to the excitation indication signal (x) in order to reduce dynamic structural loads caused by such pilot or flight control system command.

4. The method according to claim 1, wherein generating said error signal (e, e*) includes detecting signals indicating one or more of accelerations, stresses or strains at given locations of the aircraft structure.

5. The method according to claim 1, wherein the generating of said error signal (e, e*) includes subtracting contributions of pilot or flight controller commands to control surfaces of the aircraft, which are included in the structural loads.

6. The method according to claim 5, wherein said subtracting the influence of pilot or flight controller commands is carried out on the basis of a rigid body model of the aircraft.

7. The method according to claim 1, wherein said excitation indicating signal (x) is generated from a flexible body model of the aircraft, or an observer/Kalman filter.

8. The method according to claim 1, wherein said optimizing the pre-controlling rule includes frequency separation for canceling out certain frequency ranges that shall not be controlled, in particular the frequency range of pilot commands.

9. The method according to claim 1, wherein optimizing the pre-controlling rule includes an iterative algorithm.

10. The method according to claim 1, wherein said actuating of control elements of the aircraft so as to minimize dynamic structural loads includes actuating one or more of elevator, rudder, aileron or other control surfaces of the aircraft.

11. The method according to claim 1, wherein said actuating of control elements so as to minimize dynamic structural loads includes actuating one or more of electro-mechanical, electro-magnetic, hydraulic, pneumatic or piezoelectric actuators to introduce load damping forces directly into the aircraft structure.

12. The method according to claim 1, wherein optimizing said pre-controlling rule includes generating a transfer function of the aircraft.

13. The method according to claim 12, wherein the generating of the transfer function is carried out by an online-system-identification comprising filtering band-limited random noise or chirp signal by a number of n adaptive filters, wherein n corresponds to the number of the aircraft transfer functions to be identified, and subtracting the filtering response in vector form from the error signal.

14. An apparatus for minimizing dynamic structural loads of an aircraft structure introduced by an external excitation to the aircraft, comprising:
    an excitation signal generating arrangement, including a sensor configured to measure the external excitation, for generating an excitation signal (x) indicative of the external excitation of the aircraft structure;
    a regulating circuit for deriving control signals (y) for actuating control elements of the aircraft from said excitation indicating signal (x) in accordance with an adjustable pre-controlling rule, so as to reduce the dynamic structural loads introduced to the aircraft;
    an error signal generating arrangement for generating a signal indicative of structural loads of the aircraft structure and representing performance of said pre-controlling as an error signal (e, e*); and
    an optimizing circuit, connected to said regulating circuit, for optimizing said adjustable pre-controlling rule by said error signal (e, e*) and/or excitation indicating signal (x) so as to minimize said error signal (e, e*) and thereby the dynamic structural loads.

15. The apparatus according to claim 14, wherein said excitation signal generating arrangement includes sensor means for detecting signals indicating one or more of intensity and direction of turbulence, wind and gusts, angle of attack, angle of yaw.

16. The apparatus according to claim 14, wherein said error signal generating arrangement is provided with means for detecting signals indicating one or more of accelerations, stresses or strains at given locations of the aircraft structure.

17. The apparatus according to claim 14, wherein said error signal generating arrangement is provided with means for subtracting contributions of pilot or flight controller commands to control surfaces of the aircraft, which are included in the structural loads.

18. The apparatus according to claim 14, wherein said error signal generating arrangement is provided for subtracting the influence of pilot or flight controller commands on the basis of a rigid body model of the aircraft.

19. The apparatus according to claim 14, wherein said excitation signal generating arrangement is provided for generating the excitation indicating signal from a flexible body model of the aircraft, or an observer/Kalman filter.

20. The apparatus according to claim 14, wherein said optimizing circuit includes a frequency separator for optimizing the pre-controlling rule by frequency separation for subtracting the influence of pilot or flight controller commands.

21. The apparatus according to claim 14, wherein said optimizing circuit is provided for optimizing the pre-controlling rule by an iterative algorithm.

22. The apparatus according to claim 14, wherein control elements which are actuated so as to minimize dynamic structural loads include one or more of elevator, rudder, aileron or other control surfaces of the aircraft.

23. The apparatus according to claim 14, wherein control elements which are actuated so as to minimize dynamic structural loads include one or more electro-mechanical, electro-magnetic, hydraulic, pneumatic or piezoelectric actuators for introducing load damping forces directly into the aircraft structure.

24. The apparatus according to claim 14, wherein said optimizing circuit is provided for generating a transfer function of the aircraft for optimizing said pre-controlling rule.

25. The apparatus according to claim 24, wherein the optimizing circuit is provided for generating the transfer function by an online-system-identification which comprises filtering band-limited random noise or chirp signal by a number of n adaptive filters, wherein n corresponds to the number of the aircraft transfer functions to be identified, and for subtracting the filtering response in vector form from the error signal.

26. The apparatus according to claim 14, wherein information about a pilot or flight control system command is added to the excitation indication signal (x) in order to reduce dynamic structural loads caused by such pilot or flight control system command.

* * * * *